United States Patent Office 2,917,022
Patented Dec. 15, 1959

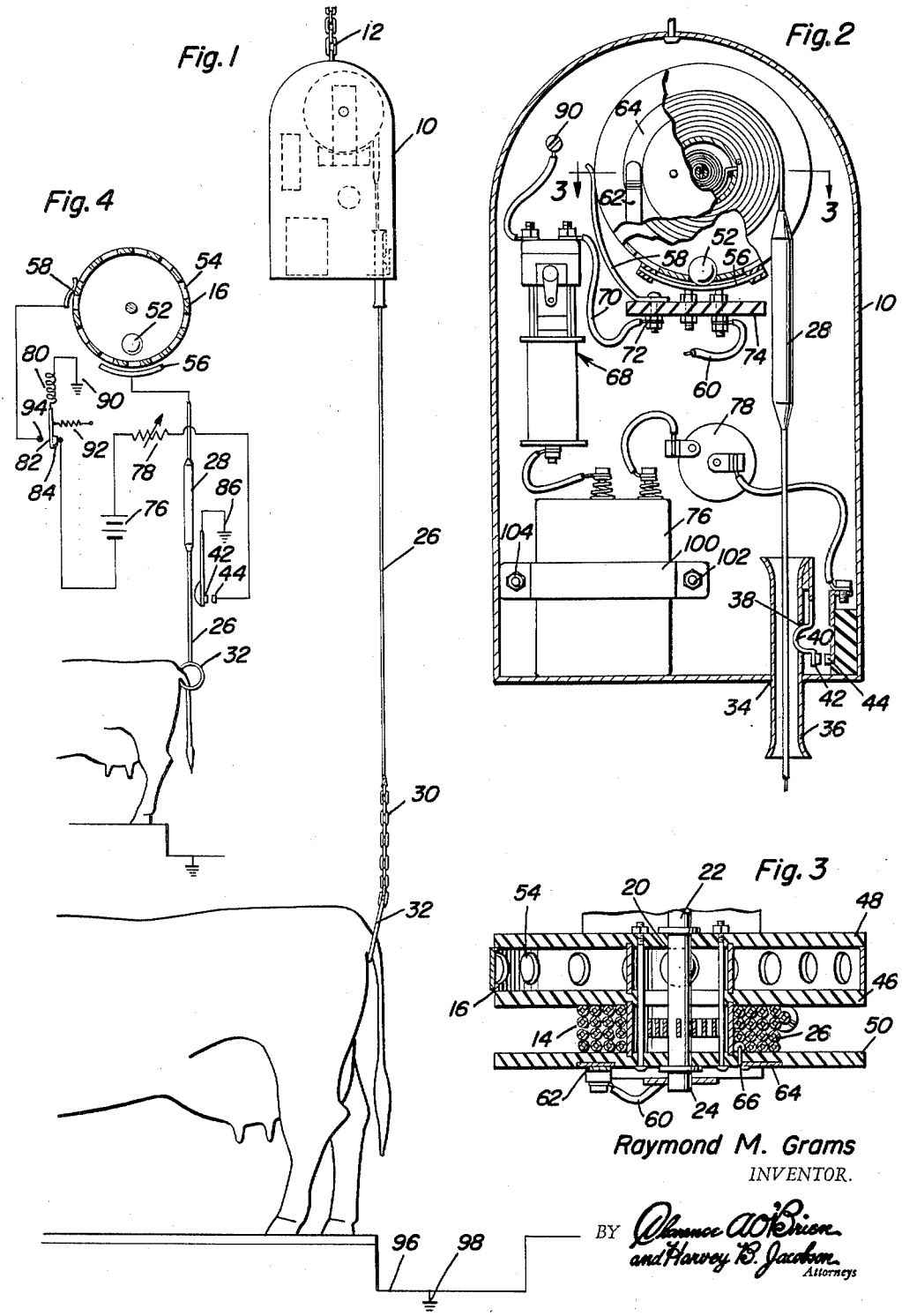

2,917,022

ELECTRICAL ANIMAL RESTRAINING DEVICE

Raymond M. Grams, Deerbrook, Wis.

Application February 13, 1958, Serial No. 715,103

3 Claims. (Cl. 119—27)

This invention is an improvement of my device in application filed February 8, 1957, Serial No. 639,166, under the title of "Electric Animal Restraining Device," now Patent 2,830,556. This invention generally relates to new and useful improvements in animal controlling or restraining devices to be used particularly in dairy barns and has for its primary object to provide, in a manner as hereinafter set forth, novel means for preventing a cow from standing with its hind feet in the usual gutter at the rear of the platform or stall.

Another very important object of this invention is to provide a restraining or controlling device of the aforementioned character comprising means for automatically electrically shocking the cow should the animal drop its hind feet into the gutter.

A further object of this invention is the provision of an electric shock in the form of a reactive discharge to the animal only when an animal steps into the electrically grounded gutter and remains there for a small interval of time. It is an accompanying object of this invention to provide no shock to the animal upon only an incidental contact with the gutter of a portion of the animal's body.

Other objects of the invention are to provide an automatic restraining or controlling device of the character described which will be comparatively simple in construction, durable, compact, highly efficient, and reliable in use and which may be manufactured and installed at low cost.

In accordance with the above stated objects, below is described a novel electric animal restraining device incorporating a rotatably mounted reel carrying an insulated wire conductor thereon which is adapted to terminally contact an animal. Rotatably mounted with the reel is a perforated metal race which carries a metallic ball therein which is adapted to electrically connect the rotatable race with a metallic plate below the race. The metallic plate is electrically connected to the wire carried by the reel and hence to the animal. A first reactive circuit is provided for supplying electrical energy to a reactive element which may be dissipated in the form of a reactive discharge through the ball and race to the wire and hence to the animal. The reactive element is grounded electrically at one side and the barn gutter forms a natural ground so a complete electrical circuit is completed through the animal for the reactive electrical discharge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view illustrating the principles of this invention;

Figure 2 is a view of the elements within the housing utilized to productive a reactive kick;

Figure 3 is a sectional view of the race and reel taken substantially along the plane 3—3 of Figure 2; and Figure 4 is an electrical circuit diagram illustrating the principles of this invention.

With continuing reference to the drawings, in Figure 1 numeral 10 represents a housing suspended from an insulated portion of a barn as by a metallic chain 12 and including therein a plurality of electrical circuit elements constituting a pair of electrical circuits.

The housing 10 includes a rotatably mounted reel 14 and race 16 which are coaxially mounted on the axis or shaft 20 which rotates in bearings 22 and 24 affixed in housing 10. The reel 14 carries thereon and concentrically with the shaft 20 a length of insulated conductive wire 26 having a thickened portion as at 28 and terminating in a metallic chain 30 which in turn is electrically connected to a conductive ring 32 adapted to contact an animal, as for instance beneath the tail. The reel 14, besides being rotatably mounted about the shaft 24 is resiliently supported about the shaft so as to contain a rewind upon being unwound by a downward pull on the insulated conductor 26.

The housing includes a circular aperture 34 through which is fitted a cylindrical guide member 36 having a hole 38 therein for the insertion of projection 40 of resilient contact 42. As will be seen most clearly in Figure 2, a downward pull on the conductor 26 will cause a rotation of the reel 14 about the shaft 24 and a paying out of the conductor so that the thickened portion 28 of the conductor 26 will proceed through the cylindrical guide 36 forcing the projection 40 outwardly from the guide 36 and causing the resilient electrical contact 42 to touch a fixed electrical contact 44.

The race 16 includes a perforated metallic cylinder and is supported on the shaft 20 adjacent the reel 14. The race 16 and reel 14 are separated by an insulated spacer 46 and are enclosed by insulators 48 and 50. A metallic ball 52 is contained within the cylindrical race and is adapted to cooperate with any of the apertures 54 contained in the race for contacting a metallic plate 56 therebeneath the race 16. A resilient contact 58 bears inwardly against the race and provides electrical contact through the race 16 to the metallic ball 52 and thence to the metallic plate 56. The plate 56 is in turn electrically connected through conductor 60 to a resilient conductor 62 which bears inwardly against a circular metallic path 64 on the flat outer surface of the reel 14. The circular metallic surface 64 is embedded in the insulator 50. The conductive path 64 is connected electrically to the insulated conductor 26 as at 66 on an inner turn of the insulated conductor 26 about the shaft 20.

Electrically feeding the resilient electrical contact 58 is a vibratory device 68 which supplies electrical energy to resilient contact 58 through wire 70 and nut and bolt combination 72 mounted in insulated plate 74.

Referring particularly to Figure 4 an electrical battery 76 is shown serially connected with a variable resistance 78 and a switch having contacts 42 and 44 as previously disclosed. A reactive element in the form of an inductor 80 completes the serially connected circuit through a movable contact 82 and fixed contact 84. It should be apparent therefore then that when the thickened portion 28 of the conductor 26 proceeds through the guide 36 the contacts 42 and 44 are closed. Contact 44 is electrically connected to ground at 86. The electrical connection to ground may be made through the electrical housing 10. The inductor 80 is likewise connected to ground as at 90. When this circuit is energized the inductor 80 tends to disconnect the circuit by pulling the armature or movable contact 82 from the fixed contact 84 against the pull of the spring 92 so as to quickly collapse the field established in inductor 80. Energy initially stored by the reactive element or inductor 80 while the movable contact 82 was in the series circuit including the battery 76, will be dissipated through the fixed contact 94, resilient contact 58 through the race 16, the ball 52, the metallic plate 56, the resilient contact 62, the circular metal path 64, to the insulated conductor 26. The cessation of current through the conductor 80 to ground allows the spring 92 to exert a force on the movable contact 82 to return it so as to electrically contact the fixed contact 84. If the contacts 42 and 44 remain electrically connected the repetition of the above noted cycle will persist and the action of the reactive element or inductor 80 will be that of a vibrator. Each time the movable contact 82 breaks contact with the fixed contact 84 so as to dissipate energy through the ball and race 52 and 16 to the conductor 26 and therefore to the ring 32 in contact with the animal, a reactive discharge or electrical shock is induced in the animal because the animal is electrically grounded by standing in the gutter 96 which is constructed of cement and forms a natural electric ground as at 98. If the animal is not in the gutter 96, that is, if for instance he lies down in the stall, the thickened portion 28 will not be in the guide 36 and so will not close the contacts 42 and 44. If the contacts 42 and 44 remain open, no energy is fed to the reactive element 80, and so no electric shock can be given by it. If the animal only incidentally steps into the grounded gutter 96 thereby turning the ball and race about the shaft 20, he will not be shocked if the thickened portion 28 leaves the guide 36 allowing the contacts 42 and 44 to open before the revolving race allows the ball 52 to settle in an aperture 54 and to so complete the electrical circuit through the plate 56.

The battery 76 is mounted within the housing 10 by a U-clamp 100 which is held to the housing by a pair of nut and bolt combinations 102 and 104. The variable resistor 78 has an external control which allows the farmer to vary the intensity of the shock administered to the animal through the ring 32. The variance 78 is due to the variance in series current through the reactive element or inductor 80 which accounts for the variation in energy dissipated through the animal. The vibratory device 68 is likewise mounted in the housing 10 above the battery 76 by conventional means not shown. In summary, in operation with the device of this invention set as shown in Figure 1, the animal is free to lie down in his stall by applying a downward force on the conductor 26 which allows the conductor 26 to pay out through the rotation of the race and reel 16 and 14. Admittedly, the thickened portion of the conductor 26 will momentarily cause a closing of contacts 42 and 44 and so energize the series circuit including the battery 76 and the inductive element 80. However, as long as the thickened portion 28 emerges from the guide 36 before the ball 52 settles in an aperture 54, the animal will not be shocked because the second circuit including the ball and race will not be completed. However, if the animal is not simply lying in his stall, but remains standing in the grounded gutter 96 allowing the ball 52 to settle in an aperture 54, the closure of contacts 42 and 44 by the thickened portion 28 will cause the vibratory action of the inductive element 80 and the discharge of reactive energy from the reactive element through the ball and race combination to the grounded gutter through the animal. An adjustment of the variable resistor 78 will adjust the intensity of the reactive discharge or the resultant shock to the animal when the animal is in the gutter 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal restraining device comprising a first circuit including a source of electrical energy, a reactive element in series with said source, a first switch in series with said source and said reactive element, a second circuit, vibrator means for periodically disconnecting said reactive element from said source to discharge reactive energy to said second circuit, said second circuit including a perforated rotatably mounted metallic race having a conductive ball therein, a conductive plate spaced below said race and adapted to be contacted by said ball, said conductive plate electrically connected to an electrical contact, said contact adapted to be carried by an animal.

2. An animal restraining device including a rotatably and resiliently mounted reel, said reel carrying thereon a length of insulated electrically conductive wire, an electrical contact electrically connected to said wire at an end thereof, and adapted to be carried by an animal, a thickened portion of said wire, an electrical switch, said thickened portion adapted to close said electrical switch, a reactive electrical circuit, said switch electrically serially connected in said reactive circuit, and means electrically connecting said reactive circuit to said electrical contact for providing a reactive discharge to said contact.

3. An animal restraining device including a rotatably and resiliently mounted reel, said reel carrying thereon a length of insulated electrically conductive wire, an electrical contact electrically connected to said wire at an end thereof, and adapted to be carried by an animal, a thickened portion of said wire, an electrical switch, said thickened portion adapted to close said electrical switch, a reactive electrical circuit, said switch electrically serially connected in said reactive circuit, and means electrically connecting said reactive circuit to said electrical contact for providing a reactive discharge to said contact, said means including a perforated race mounted to rotate with said reel, a conductive ball carried within said race and a conductive plate spaced below said race and adapted to be contacted by said ball when it is resting in a race perforation.

References Cited in the file of this patent

UNITED STATES PATENTS

| | | |
|---|---|---|
| 1,411,312 | Swenson | Apr. 4, 1922 |
| 2,830,556 | Grams | Apr. 15, 1958 |